J. P. LARKIN.
RAILWAY TICKET.
APPLICATION FILED NOV. 5, 1914.

1,151,367.

Patented Aug. 24, 1915.

WITNESSES
A. Kempler
Max H. Srolong

INVENTOR
J. P. Larkin
By Henry C. Evert
ATTORNEY

UNITED STATES PATENT OFFICE.

JOSEPH P. LARKIN, OF PITTSBURGH, PENNSYLVANIA.

RAILWAY-TICKET.

1,151,367.  Specification of Letters Patent.  Patented Aug. 24, 1915.

Application filed November 5, 1914. Serial No. 870,345.

*To all whom it may concern:*

Be it known that I, JOSEPH P. LARKIN, a citizen of the United States of America, residing at Pittsburgh, in the county of Allegheny and State of Pennsylvania, have invented certain new and useful Improvements in Railway-Tickets, of which the following is a specification, reference being had therein to the accompanying drawing.

This invention relates to a railway ticket, particularly adapted for use by employees on traction lines, and has for its object to provide, in a manner as hereinafter set forth, what is termed a trip pass ticket for an employee and includes means for setting up a check to indicate that the ticket has been used by the party to whom it was issued.

Further objects of the invention are to provide a railway ticket, termed an employee's trip pass ticket, which is simple in its construction and arrangement, efficient for the purpose for which it is intended, and convenient in its use.

With the foregoing and other objects in view the invention consists of a novel form of railway ticket as hereinafter more specifically described and illustrated in the accompanying drawings, wherein is shown an embodiment of the invention, but it is to be understood that changes, variations and modifications can be resorted to which come within the scope of the claim hereunto appended.

Figure 1:
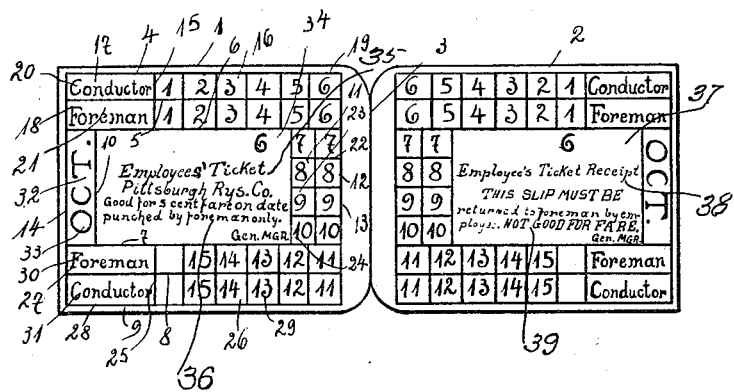
Figure 2:
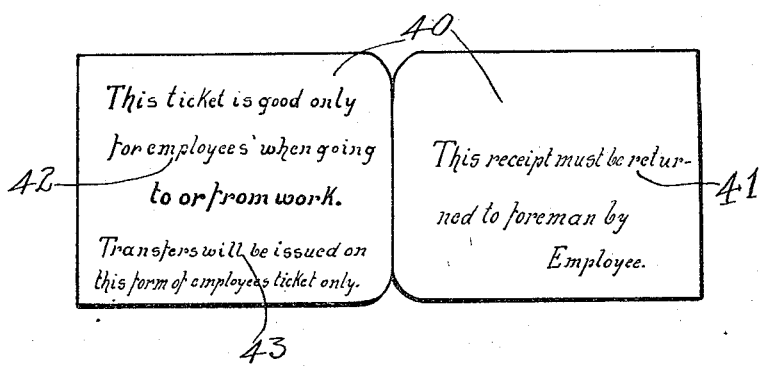

In the drawings wherein like reference characters denote corresponding parts throughout the several views:—Figure 1 is a front elevation of a ticket in accordance with this invention, the ticket being extended. Fig. 2 is a rear elevation of the ticket, the latter being extended.

A railway ticket in accordance with this invention consists of a pair of sections 1, 2, which are hinged together as at 3. The section 1 has its outer face provided with a series of longitudinal extending lines 4, 5, 6, 7, 8 and 9. The lines 6 and 7 are spaced a considerable distance apart, while the lines 4, 5 and 6 are spaced closer together than the lines 6 and 7, and the lines 7, 8 and 9 are spaced closer together than the lines 6 and 7. The lines 6 and 7 are connected together by transverse lines 10, 11, 12, 13 and 14. The line 14 connects the lines 4, 5, 6, 7, 8 and 9 together and the line 13 connects the lines 4, 5, 6, 7, 8 and 9 together. The lines 4 and 6 are connected together by a series of short transverse spaced lines 15, which intersect the line 5 and said lines 15 in connection with the lines 4, 5, 6, 13 and 14 form a pair of longitudinal extending rows of spaces 16 and a pair of elongated spaces 17, 18. In the spaces 16 of each row, the digits 1 to 6 are arranged as at 19, and in the space 17 the word "Conductor" is arranged as at 20 and in the space 18 the word "Foreman" is arranged as at 21. The word "Conductor" associates with the spaces 16 of one longitudinal row and the word "Foreman" associates with the spaces 16 of the other longitudinal row.

The lines 11 and 13 are connected together by spaced short horizontal lines 22, which in connection with the lines 6, 7, 11, 12 and 13 form two transverse rows of spaces 23 and in the spaces of each row are arranged the numerals 7 to 10 as indicated at 24.

The lines 7, 8, and 9 are connected together by a series of spaced transverse lines 25 which in connection with said lines 7, 8, and 9 and the lines 13, 14, provide two longitudinal rows of spaces 26, and a pair of larger spaces 27, 28. In the spaces 26 of each row are arranged numbers 11, to 15, and the numbers in each of said rows are reversely positioned. In the space 27 is arranged the word "Foreman" as at 30 which associates with one of the rows of numbers 29 and in the spaces 28 is arranged the word "Conductor" as at 31, which associates with the other row of numbers 29.

The transverse line 10, in connection with the lines 14, 6 and 7, form a transversely disposed space 32 in which is arranged conventional means to indicate the name of a month, as at 33. The section 2 has the same arrangement of lines, words, digits and numbers as that employed in section 1.

The lines 6, 7, 10 and 11 of the section 1 form an enlarged rectangular space 34, in which is arranged conventional means as at 35, to indicate that said section is a ticket, and said space 34 is furthermore provided with an inscription as at 36, to designate the value of the ticket and instructions in connection with the ticket.

The lines 6, 7, 10 and 11 of the section 2 forms an enlarged rectangular space 37, and arranged in said space 37 is an inscription as at 38 to indicate what said section is, as shown a ticket receipt, and said space 37 has furthermore arranged therein an inscription as at 39, to instruct one what to do with said section 2.

The outer face of the sections 1 and 2 are correspondingly numbered as at 40.

The words and numbers upon the section 1 are dark upon a light back ground, and the digits 1 to 9 and numbers 10 to 15 and the words "Conductor" and "Foreman" upon the section 2 are light in color and upon a dark background.

The rear face of the section 2 is provided with an inscription as at 41, to indicate what should be done with said section after the ticket has been handed for passage and the section 2, which is the receipt, returned to the employee. The rear face of the section 1 is provided with an inscription as at 42 to indicate when said section 1, the ticket, is valid for travel and is furthermore provided with an inscription as at 43 to indicate that transfers are issued upon the ticket.

The ticket is issued by the foreman to an employee for passage and when he issues the ticket, the sections of the ticket are folded together and the foreman punches in that row of spaces associating with the foreman, indicating the date of issue. When the conductor takes the ticket up for passage, he punches in the row of spaces, which associates with the word "Conductor," the date upon which the ticket is held for passage and after punching such date he separates the section 1 from the section 2, retaining section 1, and hands section 2 back to the employee who returns it to the foreman. Unless the receipt is returned to the foreman, the employee will not receive another ticket for travel.

What I claim is:—

A duplex traffic ticket of the class described comprising a body scored centrally to provide two sections, each section having the face thereof divided by transverse and longitudinal lines to provide an enlarged central space and a plurality of marginal spaces of a predetermined number and size, the outer end marginal spaces at the top and bottom of each section being of greater length than the remaining spaces and having inscribed therein the titles of the parties issuing and receiving the ticket, the marginal outer side space of each section between the last mentioned spaces being also enlarged and having inscribed therein the month in which the ticket is issued, the remainder of the spaces of each section having numerals inscribed therein ranging from one to fifteen adapted to be punched for denoting the date of the month upon which said ticket is issued, the spaces of the two sections which register when the ticket is folded on its transverse medial line having identical inscriptions therein.

In testimony whereof I affix my signature in the presence of two witnesses.

JOSEPH P. LARKIN.

Witnesses:
MAX H. SROLOVITZ,
MARIE H. ZBIERA.

Copies of this patent may be obtained for five cents each, by addressing the "Commissioner of Patents, Washington, D. C."